United States Patent
Kozakai et al.

(10) Patent No.: US 10,003,216 B2
(45) Date of Patent: Jun. 19, 2018

(54) NON-CONTACT ELECTRIC POWER FEEDING SYSTEM, TERMINAL DEVICE, NON-CONTACT ELECTRIC POWER FEEDING DEVICE, AND NON-CONTACT ELECTRIC POWER FEEDING METHOD

(71) Applicant: Sony Corporation, Tokyo (JP)

(72) Inventors: Osamu Kozakai, Kanagawa (JP); Hiroaki Nakano, Tokyo (JP); Shinichi Fukuda, Kanagawa (JP); Masayuki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 441 days.

(21) Appl. No.: 14/426,453

(22) PCT Filed: Jul. 2, 2013

(86) PCT No.: PCT/JP2013/068095
§ 371 (c)(1),
(2) Date: Mar. 6, 2015

(87) PCT Pub. No.: WO2014/041875
PCT Pub. Date: Mar. 20, 2014

(65) Prior Publication Data
US 2015/0263531 A1    Sep. 17, 2015

(30) Foreign Application Priority Data

Sep. 14, 2012  (JP) ................................ 2012-203492

(51) Int. Cl.
*H01F 37/00*  (2006.01)
*H02J 5/00*  (2016.01)
(Continued)

(52) U.S. Cl.
CPC .............. *H02J 50/10* (2016.02); *H02J 5/005* (2013.01); *H02J 7/025* (2013.01); *H02J 50/12* (2016.02);
(Continued)

(58) Field of Classification Search
CPC .. H02J 5/005; H02J 7/025; H02J 17/00; H02J 50/10; H02J 50/12; H02J 50/80;
(Continued)

(56) References Cited

U.S. PATENT DOCUMENTS 9,520,724 B2 *  12/2016  Anttila .................... H02J 5/005
2008/0169706 A1    7/2008  Onishi et al.
(Continued)

FOREIGN PATENT DOCUMENTS

JP  2003-009515 A  1/2003
JP  2003-216247 A  7/2003
(Continued)

OTHER PUBLICATIONS

Extended European Search Report received for European Patent Application No. 13837542.3, dated Jun. 6, 2016, 10 pages.
(Continued)

*Primary Examiner* — Hal Kaplan
(74) *Attorney, Agent, or Firm* — Chip Law Group

(57) ABSTRACT

Provided is a non-contact electric power feeding system including an electric power feeding device, and an electric power receiving device configured to receive electric power fed from the electric power feeding device. The electric power feeding device includes a primary-side coil, a driver, a primary-side control unit, and a primary-side communication unit. The electric power receiving device includes a secondary-side coil, a rectifier unit, a regulator, a secondary-side communication unit, and a secondary-side control unit.

16 Claims, 10 Drawing Sheets

100 ELECTRIC POWER FEEDING DEVICE

200 TERMINAL DEVICE

(51) Int. Cl.
  *H04B 5/00* (2006.01)
  *H02J 50/10* (2016.01)
  *H02J 7/02* (2016.01)
  *H02J 50/80* (2016.01)
  *H02J 50/12* (2016.01)
  *H02M 3/156* (2006.01)
  *H02M 1/00* (2006.01)

(52) U.S. Cl.
  CPC ..... *H02J 50/80* (2016.02); *H02M 2001/0048* (2013.01); *H02M 2003/1566* (2013.01); *Y02B 70/1491* (2013.01)

(58) Field of Classification Search
  CPC .. H02M 2001/0048; H02M 2003/1566; Y02B 70/1491; H04B 5/0025–5/0093
  USPC .......................................... 307/104; 320/108
  See application file for complete search history.

(56) References Cited

U.S. PATENT DOCUMENTS

| | | | |
|---|---|---|---|
| 2009/0271047 A1* | 10/2009 | Wakamatsu | H02J 5/005 700/295 |
| 2011/0254378 A1* | 10/2011 | Ichikawa | B60L 5/005 307/104 |
| 2011/0309811 A1 | 12/2011 | Kondo et al. | |
| 2012/0149307 A1 | 6/2012 | Terada et al. | |
| 2013/0147279 A1* | 6/2013 | Muratov | H02J 5/005 307/104 |
| 2013/0176653 A1* | 7/2013 | Kim | H02H 9/04 361/91.6 |

FOREIGN PATENT DOCUMENTS

| | | |
|---|---|---|
| JP | 2008-017550 A | 1/2008 |
| JP | 2008-178196 A | 7/2008 |
| JP | 2009-142097 A | 6/2009 |
| JP | 2009-268310 A | 11/2009 |
| JP | 2010-081522 A | 4/2010 |
| JP | 2010-239781 A | 10/2010 |
| JP | 2011-097671 A | 5/2011 |
| JP | 2011-188749 A | 9/2011 |
| JP | 2012-005335 A | 1/2012 |
| JP | 2012-130222 A | 7/2012 |
| JP | 2012-147648 A | 8/2012 |
| WO | 2011/036343 A | 3/2011 |
| WO | 2011/036343 A1 | 3/2011 |

OTHER PUBLICATIONS

Office Action for CN Patent Application No. 201380046577.X, dated Sep. 5, 2016, 9 pages of Office Action and 15 pages of English translation.

Office Action for JP Patent Application No. 2016-172611, dated Aug. 22, 2017, 6 pages of Office Action and 4 pages of English Translation.

Office Action for JP Patent Application No. 2016-172611, dated May 23, 2017, 5 pages of Office Action and 4 pages of English Translation.

Office Action for EP Patent Application No. 13837542.3, dated Dec. 5, 2017, 11 pages of Office Action.

\* cited by examiner

FIG. 2

| ITEM | SECONDARY-SIDE LOAD ELECTRIC POWER | SECONDARY-SIDE VOLTAGE | SECONDARY-SIDE CURRENT VALUE | SECONDARY-SIDE COIL RESISTANCE VALUE | SECONDARY-SIDE ELECTRIC POWER LOSS | SECONDARY-SIDE COIL HEAT TEMPERATURE |
|---|---|---|---|---|---|---|
| UNIT | W | V | A | Ω | W | °C |
| 5W ELECTRIC POWER RECEIVING SYSTEM | 5 | 5 | 1 | 0.4 | 0.4 | 13.33333333 |
| 10W ELECTRIC POWER RECEIVING SYSTEM | 10 | 10 | 1 | 0.4 | 0.4 | 13.33333333 |
| 15W ELECTRIC POWER RECEIVING SYSTEM | 15 | 15 | 1 | 0.4 | 0.4 | 13.33333333 |

COIL HEAT GENERATION IN CURRENT CONSTANT CONTROL

COMMUNICATION EXAMPLE FROM PRIMARY SIDE

COMMUNICATION EXAMPLE FROM SECONDARY SIDE

CIRCUIT SWITCHING EXAMPLE BY COIL HEAT GENERATION MONITORING

FIG. 12

| ITEM | SECONDARY-SIDE LOAD ELECTRIC POWER | SECONDARY-SIDE VOLTAGE | SECONDARY-SIDE CURRENT VALUE | SECONDARY-SIDE COIL RESISTANCE VALUE | SECONDARY-SIDE ELECTRIC POWER LOSS | SECONDARY-SIDE COIL HEAT TEMPERATURE |
|---|---|---|---|---|---|---|
| UNIT | W | V | A | Ω | W | °C |
| 5W ELECTRIC POWER RECEIVING SYSTEM | 5 | 5 | 1 | 0.4 | 0.4 | 13.33333333 |
| 10W ELECTRIC POWER RECEIVING SYSTEM | 10 | 5 | 2 | 0.4 | 1.6 | 53.33333333 |
| 15W ELECTRIC POWER RECEIVING SYSTEM | 15 | 5 | 3 | 0.4 | 3.6 | 120 |

PRIOR ART

RELATIONSHIP BETWEEN ELECTRIC POWER
LOSS AND TEMPERATURE OF SECONDARY-SIDE COIL

PRIOR ART

NON-CONTACT ELECTRIC POWER FEEDING SYSTEM, TERMINAL DEVICE, NON-CONTACT ELECTRIC POWER FEEDING DEVICE, AND NON-CONTACT ELECTRIC POWER FEEDING METHOD

TECHNICAL FIELD

The present disclosure relates to a non-contact electric power feeding system, a terminal device, a non-contact electric power feeding device, and a non-contact electric power feeding method.

BACKGROUND ART

In the past, devices such as a battery charger has supplied electric power in non-contact state without directly connecting terminal pins to the terminal devices. An electromagnetic induction method is known as such past non-contact power supply transmission method. In this method, a device on an electric power transmission side is equipped with an electric power transmission coil, and a terminal device on a reception side is equipped with an electric power receiving coil. In this electromagnetic induction method, the location of the electric power transmission coil of the transmission-side device is arranged close to the location of the electric power receiving coil of the reception-side device, in order to bond magnetic flux between both coils to send electric power without contact.

Also, what is called a magnetic field resonance method is developed as a method for efficiently supplying electric power without contact to a terminal device which is a certain distance away. In this method, the device on the electric power transmission side and the device on the electric power receiving side are each equipped with a LC circuit consisting of coils and capacitors, which allows the electric field and the magnetic field to resonate between both circuits in order to transmit the electric power wirelessly.

In both of the electromagnetic induction method and the magnetic field resonance method, the device on the electric power transmission side is equipped with an electric power transmission coil, and the device on the electric power receiving side is equipped with an electric power receiving coil. When the electromagnetic induction method is referred to in the following present specification, the electromagnetic induction method also includes a similar non-contact power supply transmission methods such as the magnetic field resonance method.

FIG. 11 is a diagram illustrating an exemplary configuration of the past, which feeds power by the electromagnetic induction method without contact to a terminal device from an electric power feeding device. An electric power feeding device 10 as a primary-side device converts an alternating current power supply 11 such as AC 100V, to direct-current low-voltage power supply, with an AC-DC converter 12. The direct-current low-voltage power supply obtained by the AC-DC converter 12 is supplied to an electric power transmission driver 13. The electric power transmission driver 13 is connected to an electric power transmission circuit, which is connected to a capacitor 14 and a primary-side coil 15, and transmission electric power of a predetermined frequency is supplied from the electric power transmission driver 13 to the primary-side coil 15.

In a terminal device 20 as a secondary-side device, a secondary-side coil 21 and a capacitor 22 are connected to a rectifier unit 23, so that the secondary-side coil 21 receives electric power from the primary-side coil 15. The series circuit of the secondary-side coil 21 and the capacitor 22 is connected to the rectifier unit 23, so that the rectifier unit 23 rectifies the received power supply, to obtain direct current power supply of a predetermined voltage Va. The predetermined voltage Va is, for example, direct-current power that is slightly over 5V.

The direct current power supply obtained by the rectifier unit 23 is supplied to a regulator 24, and is regulated at a constant voltage (for example 5V). The direct current power supply of a constant voltage obtained by the regulator 24 is supplied to a charge control unit 25, and the charge control unit 25 controls charge of the secondary battery 26.

In such configuration of a non-contact electric power feeding system, the regulator 24 of the secondary-side device is a series regulator that is normally referred to as a low drop out (LDO), which is employed when the difference between an input voltage and an output voltage is relatively small. Using the LDO as the regulator 24 enables a system whose efficiency is high to a certain extent, for reception of electric power as low as about 5 W.

In the meantime, in the non-contact electric power transmission, the transmission electric power is desired to be increased. That is, in the current non-contact electric power feeding systems that has been put into practical use, the reception electric power in the terminal device is relatively small electric power of about 1 W to 5 W. In contrast, in the non-contact transmission by the electromagnetic induction method, the terminal device is desired to obtain larger reception electric power, such as 10 W and 15 W.

Here, when large electric power is received in the configuration illustrated in FIG. 11, the regulator 24 using the LDO has a problem of large loss at a coil where a large current flows.

A switching regulator that is called a DC-DC converter is known as a regulator that processes relatively large electric power and high voltage. Patent Literature 1 describes parallel use of a regulator using an LDO and a switching regulator in the power supply device. This Patent Literature 1 describes use of the switching regulator when the load is large, and use of the regulator with the LDO when the load is small.

CITATION LIST

Patent Literature

Patent Literature 1: JP 2010-183812A

SUMMARY OF INVENTION

Technical Problem

In the past, as described in Patent Literature 1 for example, when using a regulator using an LDO and a switching regulator in parallel, a power supply device, such as an AC adaptor, detects the voltage of input power supply to switch two regulators. Here, the regulator of the secondary-side device of the non-contact electric power feeding system illustrated in FIG. 11 is not able to employ the same configuration. That is, when the non-contact electric power feeding system illustrated in FIG. 11 is configured, the input voltage Va of the regulator 24 in the terminal device 20 is approximately constant. Only current increases as the reception electric power increases. Accordingly, the configuration that switches the regulators on the basis of detected input voltage is unable to be employed.

Here, an example of heat production of the electric power receiving coil by the change of the reception electric power will be described with reference to the table of FIG. 12. FIG. 12 illustrates three examples of the reception electric power, which are 5 W, 10 W, and 15 W. In each example, when the rectifier unit 23 rectifies the voltage to 5V, the current value is 1 A in the case of the reception electric power 5 W, 2 A in the case of the reception electric power 5 W, and 3 A in the case of the reception electric power 5 W. The resistance value of the secondary-side coil 21 is dependent on the cross-sectional area of the secondary-side coil 21, and therefore is constant in any electric power. In an example of FIG. 12, the resistance value of the secondary-side coil 21 is set at 0.4Ω The electric power loss of the secondary-side coil 21 is dependent on the product of the square of current and the resistance value, as in the equation of $Q=I^2R$. Thus, as the current increases, the electric power loss increases. Here, when the conversion ratio between secondary-side electric power loss and temperature is 20° C./0.6 W, the heat temperature of the secondary-side coil 21 in each reception electric power changes as illustrated in FIG. 12. That is, when the reception electric power is 5 W, the heat temperature is approximately 13° C. When the reception electric power is 10 W, the heat temperature is approximately 53° C. When the reception electric power is 15 W, the heat temperature is approximately 120° C.

Note that, in FIG. 12, the conversion ratio between secondary-side electric power loss and temperature is set at 20° C./0.6 W on the basis of an actual measurement result of the temperature characteristics of two types of terminal devices that include coils for non-contact power feeding. That is, as illustrated in FIG. 13, when the temperature characteristics T1 of a certain type of terminal device and the temperature characteristics T2 of another type of terminal device were measured, the characteristics that shows substantially linear increase of temperature in proportion to the change of electric power loss was obtained. The conversion ratio of 20° C./0.6 W is obtained from the characteristics calculated by approximating these characteristics T1, T2 by a straight line.

In the meantime, as another problem different from the heat generation, there is a problem of efficiency of power feeding reception in small electric power, when the secondary-side device uses a switching regulator. That is, FIG. 14 is a diagram illustrating the relationship between reception electric power and electric power receiving frequency. The characteristics W1 corresponds to a regulator using an LDO, and the characteristics W2 corresponds to a switching regulator. As can be understood by comparing these characteristics W1, W2, for example, in the case of the characteristics W1 that uses an LDO, the reception electric power is large near a specific frequency band. On the other hand, in the case of the characteristics W2 that uses a switching regulator, the reception electric power is small, in the frequency band in which the characteristics W1 has large reception electric power.

As described above, an appropriate carrier frequency changes depending on the type of the regulator of the secondary-side device, and the type of the regulator is unable to be selected simply.

The purpose of the present disclosure is to solve the problems of heat generation and low efficiency when transmission electric power is large, in a non-contact electric power feeding system.

Solution to Problem

A non-contact electric power feeding system of the present disclosure is a non-contact electric power feeding system including an electric power feeding device, and a terminal device configured to receive power fed from the electric power feeding device. The electric power feeding device includes a primary-side coil, a driver configured to supply transmission electric power to the primary-side coil, a primary-side control unit configured to control the transmission electric power supplied by the driver to a plurality of levels, and a primary-side communication unit configured to communicate with a side that receives electric power fed from the primary-side coil. The terminal device includes a secondary-side coil configured to receive electric power, a rectifier unit configured to rectify reception electric power obtained by the secondary-side coil, a regulator configured to convert the reception electric power rectified by the rectifier unit to electric power of a predetermined voltage, a secondary-side communication unit, and a secondary-side control unit configured to control the regulator. The regulator conducts the conversion of the reception electric power by a plurality of methods. The secondary-side control unit controls the method of the voltage transformation conducted by the regulator, on the basis of the information received by the secondary-side communication unit that communicates with the primary-side communication unit.

Also, the terminal device of the present disclosure includes a secondary-side coil configured to receive electric power transmitted from an electric power feeding device, a rectifier unit configured to rectify reception electric power obtained by the secondary-side coil, a regulator configured to convert the reception electric power rectified by the rectifier unit to electric power of a predetermined voltage, a communication unit, and a control unit. The regulator conducts conversion of the reception electric power by a plurality of methods. The control unit controls the method of voltage transformation conducted by the regulator, on the basis of the information that the communication unit obtains from the electric power feeding device.

Also, the non-contact electric power feeding device of the present disclosure includes a primary-side coil, a driver configured to supply transmission electric power to the primary-side coil, a communication unit configured to communicate with a device of a side that receives electric power fed from the primary-side coil, and a control unit. The control unit controls the transmission electric power that the driver supplies to the primary-side coil, at a plurality of levels, and decides the transmission electric power on the basis of the information received by the communication unit.

Also, the non-contact electric power feeding method of the present disclosure is applied to a case where non-contact power feeding is conducted from an electric power feeding device including a primary-side coil to a terminal device including a secondary-side coil. In the terminal device, a regulator converts the electric power received by the secondary-side coil to the electric power of a predetermined voltage, by a plurality of methods of conversion. Then, the method of voltage transformation conducted by the regulator is set on the basis of the information obtained in the communication between the electric power feeding device and the terminal device.

According to the present disclosure, the regulator included in the terminal device that receives the electric power transmitted from the electric power feeding device is set in an appropriate type for conducting voltage transformation on the basis of the information instructed from the electric power feeding device.

Advantageous Effects of Invention

According to the present disclosure, conversion method of the regulator is set to an efficient, appropriate conversion method, so as to increase the transmission efficiency and effectively prevent the heat generation of the coil, regardless of reception electric power in the terminal device.

BRIEF DESCRIPTION OF DRAWINGS

FIG. 2 is a characteristic table of exemplary change of reception electric power according to an embodiment of the present disclosure.

FIG. 12 is a characteristic table of exemplary change of reception electric power according to an example of FIG. 11.

DESCRIPTION OF EMBODIMENTS

Figure 3:
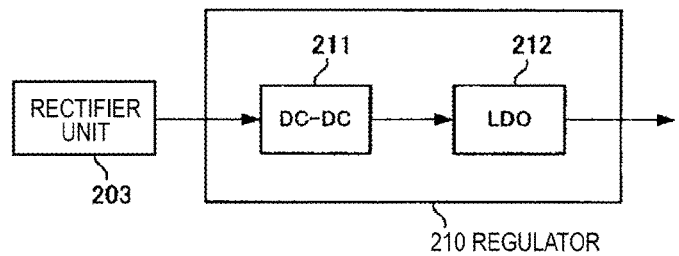
FIG. 3 is a block diagram illustrating an exemplary configuration (example 1) of a regulator according to an embodiment of the present disclosure.
Figure 4:
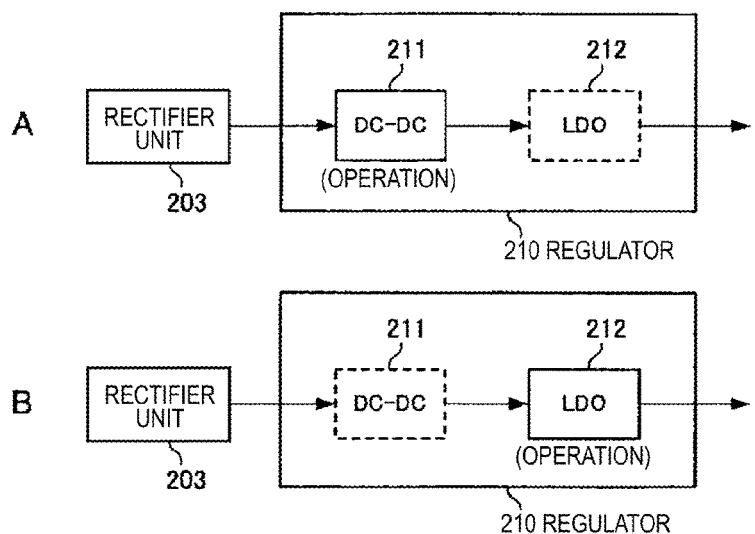
FIG. 4 is a diagram illustrating an operating state of a regulator of an example of FIG. 3.
Figure 5:
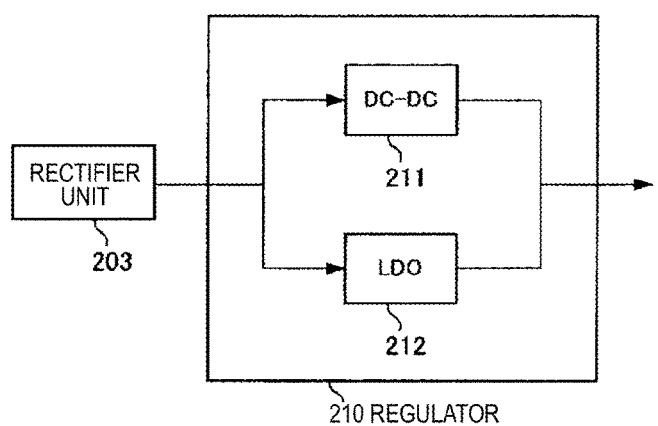
FIG. 5 is a block diagram illustrating an exemplary configuration (example 2) of a regulator according to an embodiment of the present disclosure.
Figure 6:
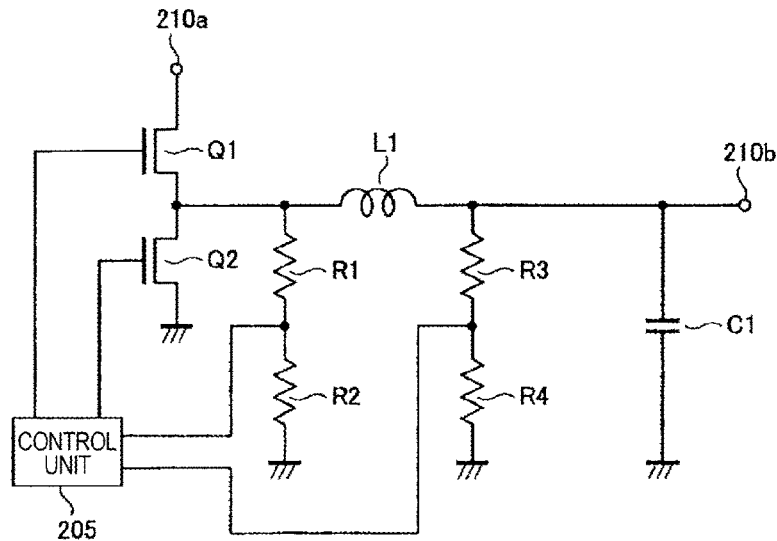
FIG. 6 is a block diagram illustrating an exemplary configuration (example 3) of a regulator according to an embodiment of the present disclosure.
Figure 7:
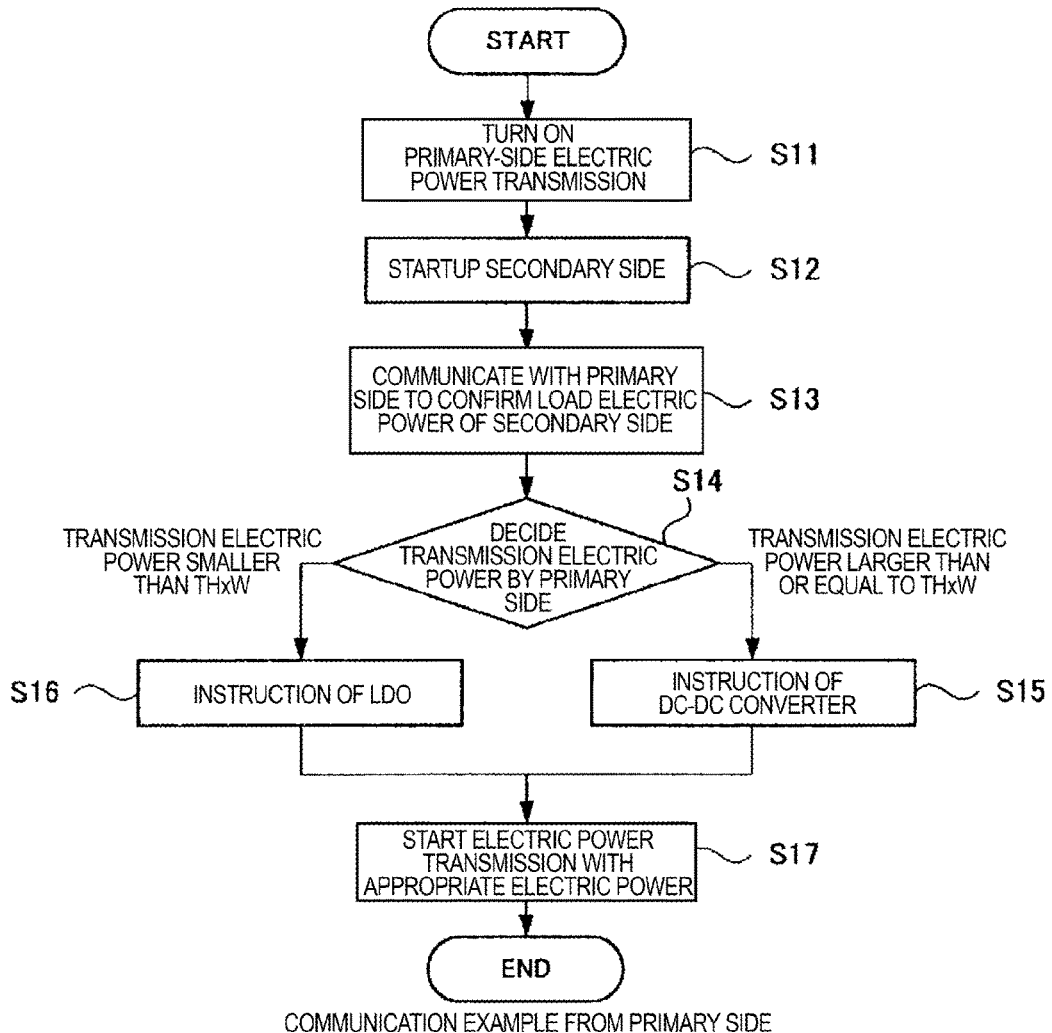
FIG. 7 is a flowchart illustrating an exemplary operation (exemplary communication from a primary side) according to an embodiment of the present disclosure.
Figure 8:
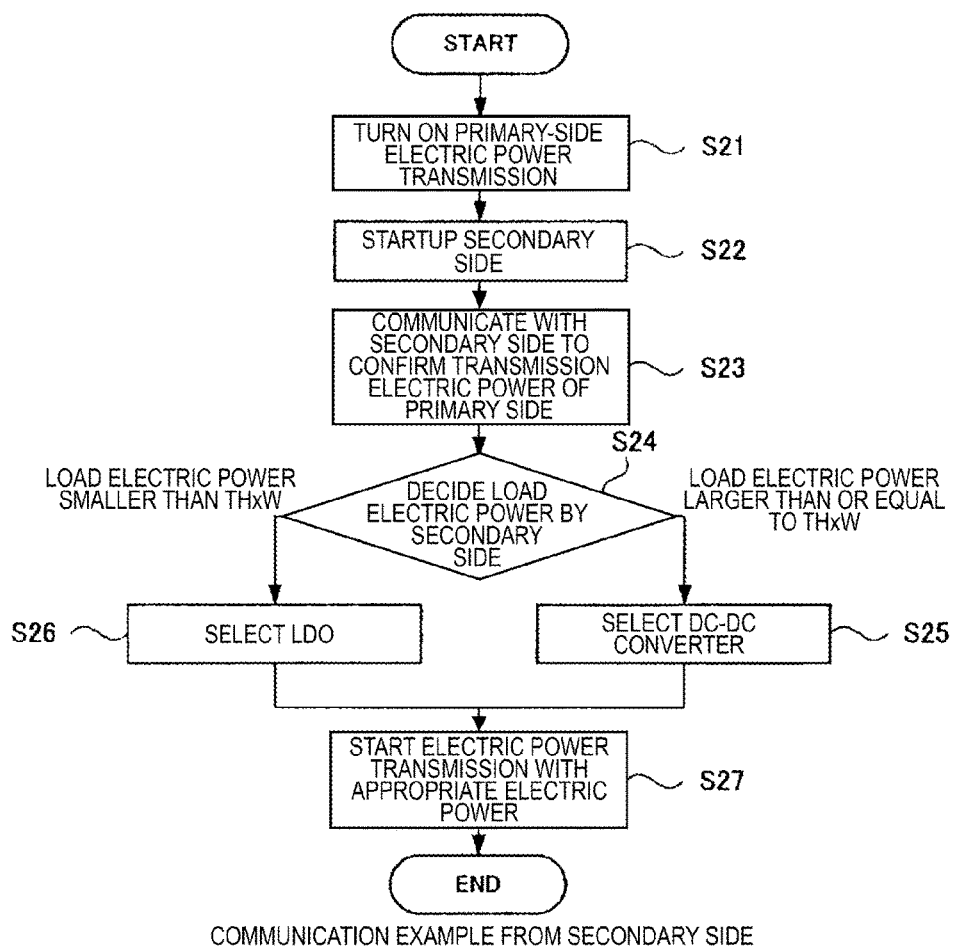
FIG. 8 is a flowchart illustrating an exemplary operation (exemplary communication from a secondary side) according to an embodiment of the present disclosure.
Figure 9:
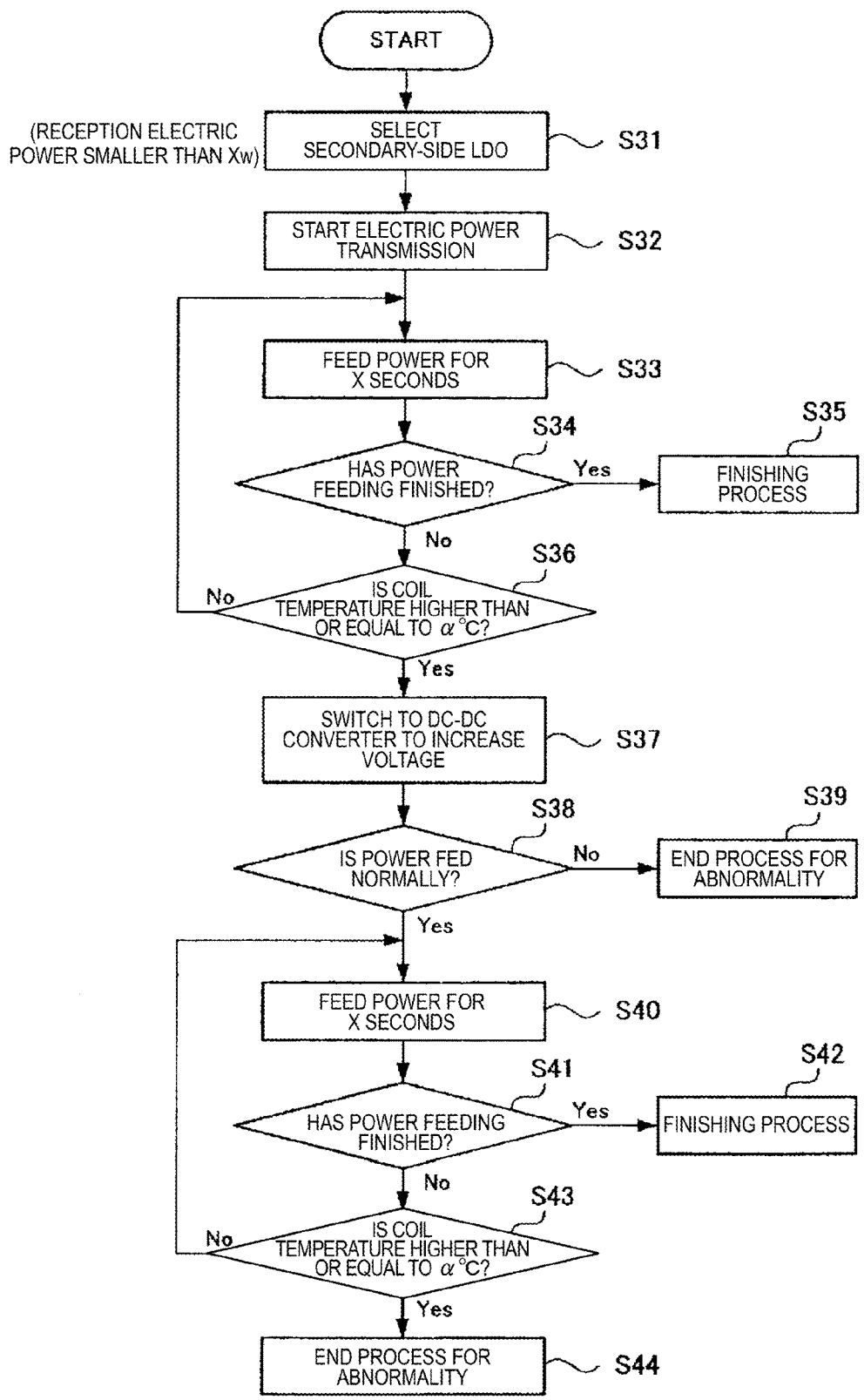
FIG. 9 is a flowchart illustrating an operation (variant example 1: exemplary control by temperature) according to an embodiment of the present disclosure.
Figure 10:
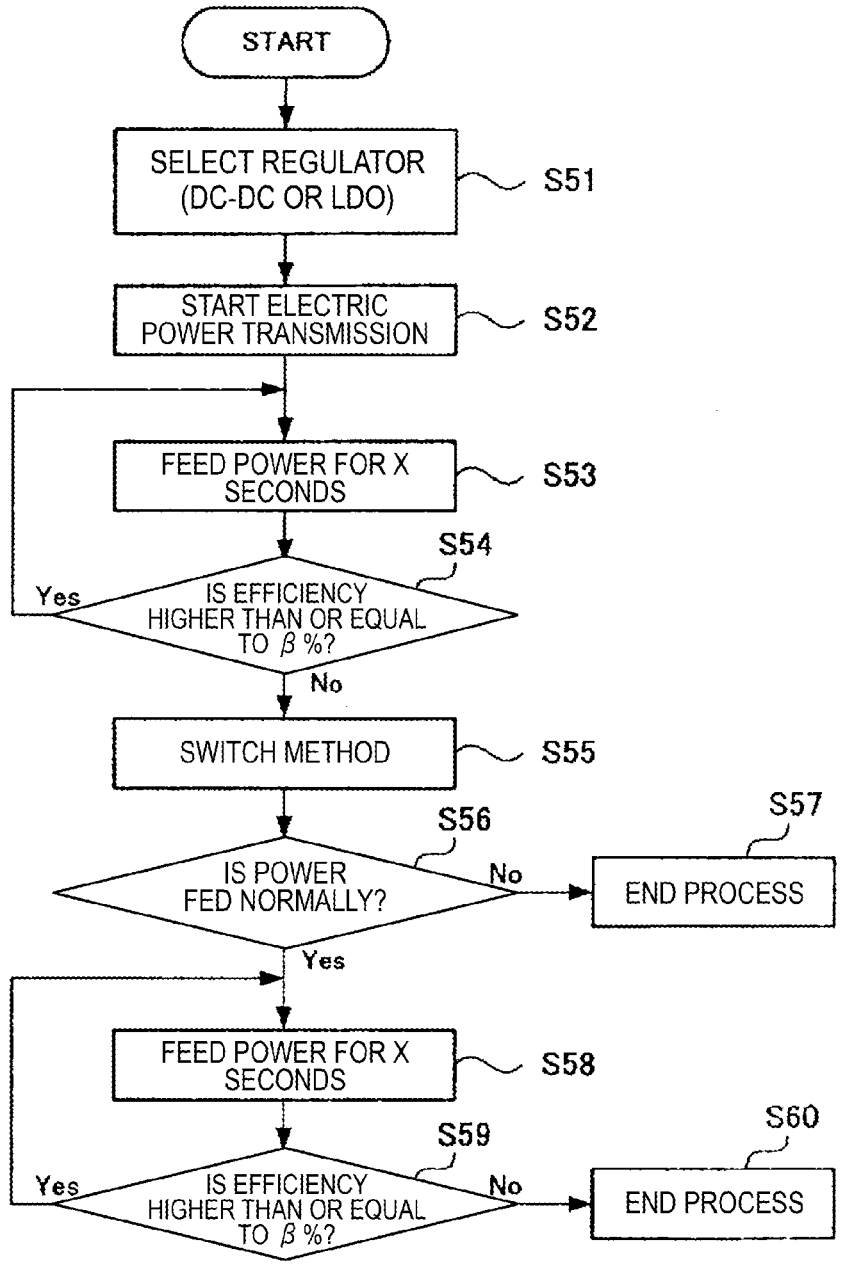
FIG. 10 is a flowchart illustrating an operation (variant example 2: exemplary control by efficiency) according to an embodiment of the present disclosure.
Figure 11:
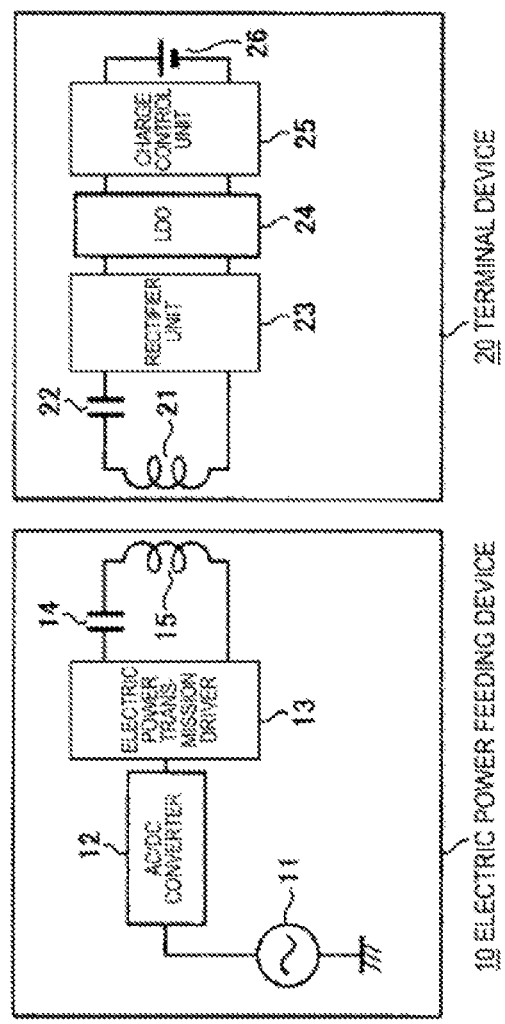
FIG. 11 is a block diagram illustrating an exemplary system configuration of the past.
Figure 13:
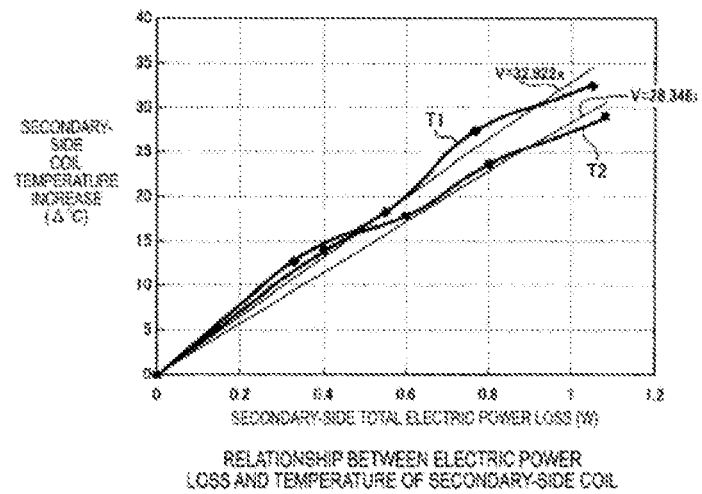
FIG. 13 is a characteristic diagram illustrating exemplary heat generation of a terminal device of the past.
Figure 14:
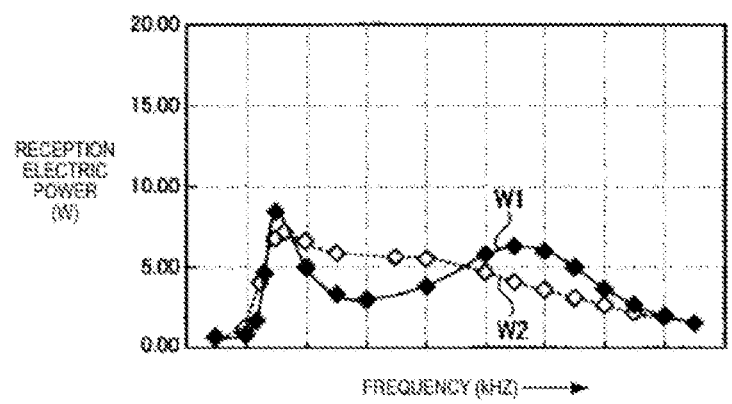
FIG. 14 is a characteristic diagram illustrating an example of reception electric power of each type of a regulator.

Examples of a non-contact electric power feeding system, a terminal device, a non-contact electric power feeding device, and a non-contact electric power feeding method according to embodiments of the present disclosure will be described with reference to drawings, in the following order.
1. Exemplary configurations of an electric power feeding device and a terminal device (FIGS. 1 and 2)
2. An example of a regulator (example 1: FIGS. 3 and 4)
3. An example of a regulator (example 2: FIG. 5)
4. An example of a regulator (example 3: FIG. 6)
5. An exemplary power feeding process (example 1: FIG. 7)
6. An exemplary power feeding process (example 2: FIG. 8)
7. A variant example of power feeding process (variant example 1: FIG. 9)
8. A variant example of power feeding process (variant example 2: FIG. 10)
9. Other variant examples

Figure 1:
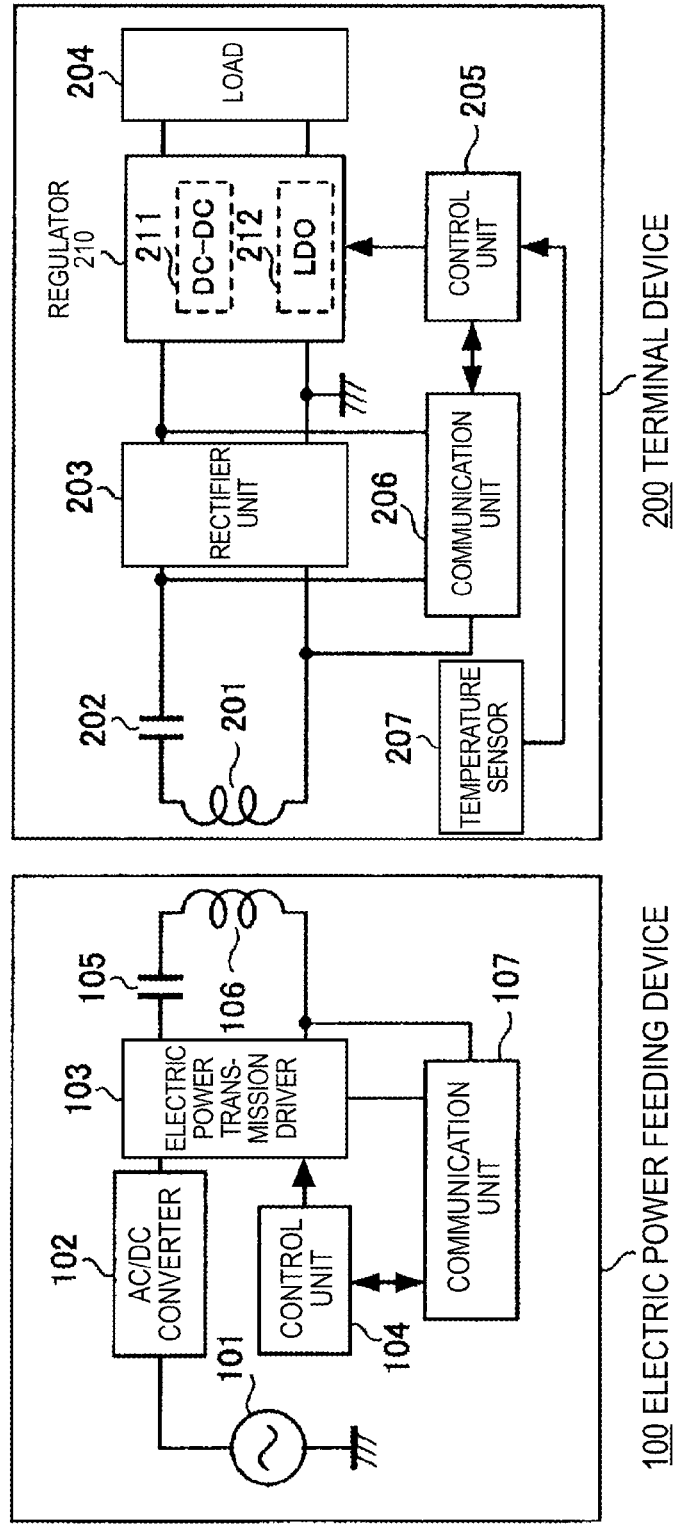
FIG. 1 is a block diagram illustrating an exemplary system configuration according to an embodiment of the present disclosure.

1. Exemplary Configurations of Electric Power Feeding Device and Terminal Device FIG. 1 is a diagram illustrating an exemplary configuration of a non-contact electric power feeding system according to an example of an embodiment of the present disclosure. The non-contact electric power feeding system of the present disclosure includes an electric power feeding device 100 as a primary-side device, and a terminal device (electric power receiving device) 200 as a secondary-side device, and feeds electric power without contact by the electromagnetic induction method. The electric power feeding device 100 is a device that receives supply such as commercial alternating current power supply and feeds the power supply to the terminal device 200 without contact. The terminal device 200 includes a load circuit that operates with the power supply supplied from the electric power feeding device 100. Alternatively, the terminal device 200 may include a secondary battery that is charged by the power supply supplied from the electric power feeding device 100. The terminal device 200 is applicable to various types of terminal devices (electronic devices), such as a mobile phone terminal device and a portable audio player device.

The electric power feeding device 100 of the primary-side device converts an alternating current power supply 101 such as AC 100V to direct-current low-voltage power supply, with an AC-DC converter 102. The direct-current low-voltage power supply obtained by the AC-DC converter 102 is supplied to an electric power transmission driver 103. Use of the alternating current power supply 101 is just an example. For example, a direct current power supply may be used as an input power supply. The electric power transmission driver 103 is connected to an electric power transmission circuit having a capacitor 105 and a primary-side coil 106 connected to each other, and transmission electric power of a predetermined frequency is supplied to a primary-side coil 106 from the electric power transmission driver 103.

The electric power feeding device 100 includes a control unit (primary-side control unit) 104 that controls a power feeding process. The control unit 104 controls the transmission electric power supplied to the primary-side coil 106 from the electric power transmission driver 103. In the electric power feeding device 100 of an example of the present embodiment, the transmission electric power is variably settable at a plurality of levels. The control unit 104 sets the transmission electric power value at one of the plurality of levels. A specific example of setting of the transmission electric power will be described later.

Also, the electric power feeding device 100 includes a communication unit 107. The communication unit 107 communicates with the terminal device 200 in both directions. For example, the communication unit 107 superimposes a transmission signal, on the transmission electric power supplied to the primary-side coil 106 from the electric power transmission driver 103, for the purpose of communication. Specifically, the communication unit 107 utilizes the frequency of the transmission electric power supplied to the primary-side coil 106 as a carrier wave, and modulates information by ASK (amplitude shift keying) or other modulation methods to transmit it. The transmission of information to the communication unit 107 from the terminal device 200 is conducted by the same method. Alternatively, the transmission of information to the communication unit 107 from the terminal device 200 may utilize a subcarrier that has a different frequency from the transmission electric power. With respect to the method for transmitting information in both directions together with electric power without contact between adjacent coils, various types of methods has already been put into practical use, for example, for the communication between a non-contact IC card and a reader. An example of the present disclosure may employ any method.

Next, the terminal device 200, which is the secondary-side device, will be described. In the terminal device 200, a secondary-side coil 201 and a capacitor 202 are connected to a rectifier unit 203, and the secondary-side coil 201 receives electric power from the primary-side coil 106. In the case of the electromagnetic induction method, the primary-side coil 106 and the secondary-side coil 201 are normally located at adjacent positions. The rectifier unit 203 rectifies the power supply of a predetermined frequency received by the secondary-side coil 201, to obtain direct current power supply.

Then, the direct current power supply obtained by the rectifier unit 203 is supplied to a regulator 210. The regulator 210 is a voltage converter that converts the voltage of input power supply to a predetermined voltage. The direct current power supply of a predetermined voltage obtained by the regulator 210 is supplied to a load circuit 204. Note that a secondary battery may be charged instead of the load circuit 204.

The regulator 210 of an example of the present disclosure performs the conversion of the reception electric power by a plurality of methods. In an example of FIG. 1, the regulator 210 includes two types of conversion circuits, which are a DC-DC converter 211 and an LDO 212. The DC-DC converter 211 is referred to as "switching regulator", which is a circuit that switches input power supply with switching elements at a relatively high speed and rectifies and smooths the switched power supply to obtain a desired voltage of direct current power supply. The DC-DC converter 211 has a wide variable range of input voltage.

The LDO 212 is a series regulator that controls the voltage drop amount in a transistor element to obtain a desired voltage of direct current power supply. The LDO 212 has a narrow variable range of input voltage, and converts the voltage efficiently when input voltage is slightly higher than output voltage.

The regulator 210 uses the circuit of one of the DC-DC converter 211 and the LDO 212, to convert the voltage of the input power supply to a stable constant voltage. The circuit that the regulator 210 uses for conversion is decided by an instruction from a control unit (secondary-side control unit) 205 that controls electric power reception. In the case of an example of the present disclosure, the DC-DC converter 211 is used when the input voltage is a relatively high voltage, and the LDO 212 is used when the input voltage is a relatively low voltage. The detail of the selection operation of the DC-DC converter 211 and the LDO 212 by the control of the control unit 205 will be described later.

Also, the terminal device 200 includes a communication unit 206, and communicates with the communication unit 107 of the electric power feeding device 100 in both directions. In order for the communication unit 206 to communicate, the series circuit with the secondary-side coil 201 and the capacitor 202 is connected to the communication unit 206, to detect the signal superimposed on the power supply supplied from the electric power feeding device 100, and thereby receive the signal transmitted from the communication unit 107. Also, the signal transmitted from the communication unit 206 is supplied to the series circuit with the secondary-side coil 201 and the capacitor 202. Also, the terminal device 200 includes a temperature sensor 207 that measures the temperature of a vicinity of the secondary-side coil 201. The data of the temperature measured by the temperature sensor 207 is supplied to the control unit 205.

The non-contact electric power feeding system of the present disclosure is operable to set the feed electric power at at least three levels, which are 5 W, 10 W, and 15 W, when the power is fed to the terminal device 200 from the electric power feeding device 100. Then, when the terminal device 200 receives the feed electric power, the input voltage Vx in the regulator 210 corresponding to the feed electric power is set, and the regulator 210 converts the reception electric power of the input voltage Vx to a constant voltage, and outputs it. The setting of the input voltage Vx in the regulator 210 is controlled by the control unit 205. At this time, the control unit 205 uses an appropriate one of the DC-DC converter 211 and the LDO 212, and controls the conversion, as described above.

FIG. 2 is a table illustrating examples of feed electric power, reception electric power voltage in the terminal device 200 (i.e., the input voltage Vx in the regulator 210), electric power loss, and heat generation. The condition of heat generation is same as the condition in FIG. 12 that illustrates examples of the past. This FIG. 2, illustrates three examples of 5 W power feeding, 10 W power feeding, and 15 W power feeding. When the electric power feeding device 100 feeds power in each example of 5 W, 10 W, and 15 W, the input voltages Vx in the regulator 210 (secondary-side voltage) are set at 5V, 10V, 15V respectively, and the secondary-side currents obtained in the terminal device 200 are set at approximately 1 A in each case, in these examples.

The resistance values of the secondary-side coil 201 are same in all examples, and the secondary-side currents are 1 A for all feed electric power values, and thus the secondary-side electric power losses are 0.4 W for all electric power values. Accordingly, the heat temperatures of the secondary-side coil 201 are approximately 13° C. for all electric power values. Note that the heat temperatures illustrated in FIG. 2 are calculated in accordance with the condition (20° C./0.6 W) set in the examples of FIG. 12.

2. Example of Regulator (Example 1)

Next, an example of the specific configuration of the regulator 210 will be described. Here, three examples including example 1, example 2, and example 3 will be described.

FIG. 3 is a diagram illustrating the configuration of the regulator 210 of an example 1. In the configuration illustrated in FIG. 3, the DC-DC converter 211 and the LDO 212 are connected in series. Although, in an example of FIG. 3 the LDO 212 is connected at downstream of the DC-DC converter 211, the inverse connection order may be employed. Only one of the DC-DC converter 211 and the LDO 212 is in operation. The other one of the DC-DC converter 211 and the LDO 212, which halts its operation, outputs the input signal as it is.

FIG. 4 is a diagram illustrating operating states of the regulator 210 of the example of FIG. 3. When using the DC-DC converter 211, the control unit 205 operates the DC-DC converter 211, and disables the LDO 212, as illustrated in FIG. 4A. In this way, the power supply converted by the DC-DC converter 211 is obtained at the output of the regulator 210.

Also, when using the LDO 212, the control unit 205 operates the LDO 212, and disables the DC-DC converter 211, as illustrated in FIG. 4B. In this way, the power supply converted by the LDO 212 is obtained at the output of the regulator 210.

3. Example of Regulator (Example 2)

FIG. 5 is a diagram illustrating the configuration of the regulator 210 of an example 2. In the configuration illustrated in FIG. 5, the DC-DC converter 211 and the LDO 212 are connected in parallel. The control unit 205 controls one of the DC-DC converter 211 and the LDO 212 to operate, in such a manner that only the controlled one operates.

4. Example of Regulator (Example 3)

FIG. 6 is a diagram illustrating the configuration of the regulator 210 of an example 3. In the configuration illustrated in FIG. 6, the DC-DC converter 211 and the LDO 212 share a common circuit. As illustrated in FIG. 6, two transistors Q1, Q2 are connected between an input terminal 210a and a ground potential portion of the regulator 210. The two transistors Q1, Q2 are controlled to be turned on and off by the control unit 205. A connection point between the both transistors Q1, Q2 is connected to the output terminal 210b of the regulator 210 via a coil L1. One end of a smoothing capacitor C1 is connected to a connection point between the coil L1 and the output terminal 210b.

A series circuit of resistors R1, R2 for voltage detection is connected between a ground potential portion and a connection point between the transistors Q1, Q2 and the coil L1. Also, a series circuit of resistors R3, R4 for voltage detection is connected between a ground potential portion and a connection point between the coil L1 and the output terminal 210b. The control unit 205 detects the voltage of a connection point between the resistors R1, R2, and the voltage of a connection point between the resistors R3, R4.

When the regulator 210 is used as the DC-DC converter 211 in the configuration illustrated in FIG. 6, the control unit 205 executes switching operation by turning on and off the two transistors Q1, Q2 at a high speed. At this time, the control unit 205 monitors the voltage charged to the smoothing capacitor C1 on the basis of the voltage of the connection point between the resistors R3, R4, and controls the switching state of the two transistors Q1, Q2 in such a manner to adjust the detected voltage.

Also, when the regulator 210 is used as the LDO 212 in the configuration illustrated in FIG. 6, the transistor Q1 is controlled as a voltage controlling element. The control unit 205 sets the transistor Q2 in an open state. At this time, the control unit 205 detects the voltage of the connection point between the resistors R1, R2, and controls the voltage drop amount in the transistor Q1 to adjust the voltage.

5. Exemplary Power Feeding Process (Example 1)

Next, an exemplary power feeding process conducted between the electric power feeding device 100 and the terminal device 200 will be described. Here, two examples: an example 1 in which the process is conducted with communication from the electric power feeding device 100 (FIG. 7), and an example 2 in which the process is conducted with communication from the terminal device 200 (FIG. 8) will be described. In both examples, the primary-side coil 106 of the electric power feeding device 100, the secondary-side coil 201 of the terminal device 200 are adjacent to each other, so that electric power is transmittable.

FIG. 7 is a flowchart illustrating an exemplary power feeding process of an example 1. The process is described in accordance with FIG. 7. First, the control unit 104 of the electric power feeding device 100, which is the primary-side device, starts supplying transmission electric power from the electric power transmission driver 103 to the primary-side coil 106 (step S11). At this time, relatively low electric power for startup is set. That is, the control unit 104 sets the electric power lower than electric power such as 5 W and 15 W, which are described above. This low electric power for startup may be electric power that enables communication between the communication unit 107 of the primary side and the communication unit 206 of the secondary side. Alternatively, the control unit 104 may set the transmission electric power for startup at 5 W, which is the smallest electric power among the plurality of settable levels of electric power, which is described above.

By starting electric power transmission in this way, the control unit 205 and the communication unit 206 of the terminal device 200 as the secondary-side device are activated (step S12). At the time of startup, a signal indicating the startup may be transmitted from the communication unit 206 of the terminal device 200 to the communication unit 107 of the electric power feeding device 100.

Then, upon startup of the secondary-side device, the control unit 104 of the electric power feeding device 100 causes the communication unit 107 to transmit a signal for confirming the load electric power that is to be used by the load circuit 204 of the terminal device 200, (step S13). When the communication unit 206 of the terminal device 200 receives the signal for confirming the load electric power, the control unit 205 causes the communication unit 206 to return the information indicating the load electric power, and the control unit 104 of the electric power feeding device 100 confirms the load electric power on the basis of the information transmitted.

Then, the control unit 104 decides the transmission electric power corresponding to the confirmed load electric power (step S14). For example, the control unit 104 selects the transmission electric power that is same as the load electric power or larger than the load electric power. At this time, the control unit 104 may transmit the information of the decided transmission electric power, from the communication unit 107 to the terminal device 200.

The control unit 205 of the terminal device 200 determines whether the transmission electric power is larger than or equal to a threshold value THx or smaller than the threshold value THx, on the basis of the information received by the communication unit 206. Here, if the transmission electric power is larger than or equal to the threshold value THx, the control unit 205 issues an instruction to use the DC-DC converter 211 as the regulator 210 (step S15). Also, if the transmission electric power is smaller than the threshold value THx, the control unit 205 issues an instruction to use the LDO 212 as the regulator 210 (step S16). Note that the input voltage of the regulator 210 is appropriately set on the basis of the transmission electric power, for example. As an example, when the current is to be kept constant, the control unit 205 sets one of the input voltages 5V, 10V, and 15V for the transmission electric power 5 W, 10 W, and 15 W, as illustrated in FIG. 2.

Then, the control unit 104 of the electric power feeding device 100 starts the power feeding with the transmission electric power decided in step S14 (step S17). As described above, according to the process of the flowchart of FIG. 7, the regulator 210 in the terminal device 200 uses an appropriate one of the DC-DC converter 211 and the LDO 212 to convert the voltage, on the basis of the transmission electric power instructed from the electric power feeding device 100.

6. Exemplary Power Feeding Process (Example 2)

FIG. 8 is a flowchart illustrating the exemplary power feeding process of an example 2. The process is described in accordance with FIG. 8. First, the control unit 104 of the electric power feeding device 100, which is the primary-side device, starts supplying the transmission electric power from the electric power transmission driver 103 to the primary-side coil 106 (step S21). At this time, relatively low electric power for startup is set in the same way as the process in step S11 of the flowchart of FIG. 7.

By starting electric power transmission in this way, the control unit 205 and the communication unit 206 of the terminal device 200 as the secondary-side device are activated (step S22).

Then, upon startup of the secondary-side device, the control unit 205 of the terminal device 200 transmits a signal for confirming the transmission electric power of the electric power feeding device 100, from the communication unit 206 (step S23). When the communication unit 107 of the electric power feeding device 100 receives the signal for confirming the transmission electric power, the control unit 104 returns the information indicating the transmission electric power from the communication unit 107, and the control unit 205 of the terminal device 200 confirms the transmission electric power from the information transmitted.

Then, the control unit 205 decides the load electric power corresponding to the confirmed transmission electric power (step S24). That is, the control unit 205 decides a load electric power consumed by the load circuit 204 within a range that does not exceed the presented transmission electric power. Then, the control unit 205 determines whether the decided load electric power is larger than or equal to a threshold value THx, or smaller than the threshold value THx. Here, if the load electric power is larger than or equal to the threshold value THx, the control unit 205 issues an instruction to use the DC-DC converter 211 as the regulator 210 (step S25). Also, if the load electric power is smaller than the threshold value THx, the control unit 205 instructs the regulator 210 to use the LDO 212 (step S26). Note that, in this example as well, the input voltage of the regulator 210 is appropriately set on the basis of the transmission electric power, for example. As an example, when the current is to be kept constant, the control unit 205 sets one of the input voltages 5V, 10V, and 15V for the transmission electric power 5 W, 10 W, and 15 W, as illustrated in FIG. 2.

Then, the control unit 104 of the electric power feeding device 100 starts the power feeding with the transmission electric power notified in step S23 (step S27). As described above, according to the process of the flowchart of FIG. 8, in response to the load electric power set in the terminal device 200, the regulator 210 uses an appropriate one of the DC-DC converter 211 and the LDO 212 to convert the voltage.

As illustrated in the flowchart of FIGS. 7 and 8, one of the DC-DC converter 211 and the LDO 212 is selected for use in the voltage conversion, on the basis of the transmission electric power or the load electric power. Hence, efficient non-contact power feeding is performed in both of small electric power transmission and large electric power transmission, and the heat generation of the secondary-side coil 201 is reduced in large electric power transmission.

7. Variant Example of Power Feeding Process
(Variant Example 1)

FIG. 9 is a flowchart illustrating a variant example of the power feeding process 1. In the flowchart of FIGS. 7 and 8, the setting of the regulator 210 is conducted at the start of the power feeding. In contrast, in the variant example 1, the control unit 205 of the terminal device 200 conducts the setting of the regulator 210 on the basis of the temperature detected by the temperature sensor 207.

That is, first, the control unit 205 of the terminal device 200 instructs the regulator 210 to use the LDO 212, assuming that the reception electric power is smaller than the threshold value THx (step S31). Then, after the electric power feeding device 100 starts the electric power transmission (step S32), the control unit 205 of the terminal device 200 receives the electric power for predetermined X seconds (step S33), and determines whether or not the power feeding has finished (step S34). Here, X seconds is, for example, a period about 60 seconds.

If the control unit 205 determines that the power feeding has finished in step S34, the control unit 205 executes the process to finish the electric power reception (step S35). If the control unit 205 determines that the power feeding continues in step S34, the control unit 205 determines whether or not the temperature detected by the temperature sensor 207 is higher than or equal to temperature α° C., which is a predetermined threshold value (step S36). Here, if the control unit 205 determines that the temperature is not higher than or equal to α° C., the control unit 205 returns to the process of step S33.

If the control unit 205 determines that the temperature is higher than or equal to α° C. in step S36, the control unit 205 instructs the regulator 210 to use the DC-DC converter 211, and changes the input voltage of the regulator 210 to a high voltage such as 10V (step S37). After changing the setting of the regulator 210, the control unit 205 determines whether or not the fed electric power is normally received (step S38). If the control unit 205 determines that the fed electric power is not normally received, the control unit 205 regards it as an abnormal state and stops the power feeding process (step S39).

If the control unit 205 determines that the fed electric power is normally received in step S38, the control unit 205 receives the electric power for predetermined X seconds (step S40), and determines whether or not the power feeding has finished (step S41).

If the control unit 205 determines that the power feeding has finished in step S41, the control unit 205 executes the process to finish the electric power reception (step S42). If the control unit 205 determines that the power feeding continues in step S41, the control unit 205 determines whether or not the temperature detected by the temperature sensor 207 is higher than or equal to temperature α° C., which is a predetermined threshold value (step S43). Here, if the control unit 205 determines that the temperature is not higher than or equal to α° C., the control unit 205 returns to the process of step S40. If the control unit 205 determines that the temperature is larger than or equal to α° C. in step S40, the control unit 205 stops the power feeding process, which is in an abnormal state (step S44).

As illustrated in the flowchart of FIG. 9, the control unit 205 decides the conversion method in the regulator 210 on the basis of the determination of whether or not the temperature near the secondary-side coil 201 is higher than or equal to α° C., which is a predetermined threshold value of temperature, in order to set an appropriate conversion method and input electric power. That is, in the state where the secondary-side coil 201 has hardly generated heat, the control unit 205 determines that appropriate non-contact power feeding is conducted, and receives electric power in the condition that has been set first. In the state where the secondary-side coil 201 has generated heat to a certain extent, the control unit 205 determines that the feed electric power is large, and changes the conversion method and the input voltage, to appropriately receive electricity.

Note that the process illustrated in the flowchart of FIG. 9 may be executed singly. Alternatively, the control unit 205 may execute the process illustrated in the flowchart of FIG. 9, after executing the process to start the power feeding at the start of the power feeding illustrated in the flowchart of FIG. 7 or FIG. 8, for example.

8. Variant Example of Power Feeding Process (Variant Example 2)

FIG. 10 is a flowchart illustrating a variant example of the power feeding process 2. In the variant example 2, the control unit 205 of the terminal device 200 determines the electric power reception efficiency of the feed electric power, for the purpose of the setting of the regulator 210.

That is, first, the control unit 205 of the terminal device 200 instructs the regulator 210 to select one of the DC-DC converter 211 and the LDO 212 to conduct conversion (step S51). Then, after the electric power feeding device 100 starts the electric power transmission (step S52), the control unit 205 of the terminal device 200 receives the electric power for predetermined X seconds (step S53), and determines whether or not the electric power reception efficiency of the currently fed electric power is larger than or equal to predetermined β% (step S54). The control unit 205 calculates this electric power reception efficiency. For example, the control unit 205 acquires the information of the transmission electric power from the electric power feeding device 100, and the control unit 205 measures the electric power received by the terminal device 200, and the control unit 205 calculates the electric power reception efficiency, using the reception electric power and the feed electric power.

If the control unit 205 determines that the electric power reception efficiency is not higher than or equal to β% in step S54, the control unit 205 issues an instruction to switch the conversion method of the regulator 210 to the other method (step S55). At this time, when the input voltage is to be set, the input voltage is also switched. Thereafter, the control unit 205 determines whether or not the power feeding has finished (step S56). If the control unit 205 determines that the power feeding has finished in step S56, the control unit 205 executes the process to finish the electric power reception (step S57). Then, when the control unit 205 determines that the power feeding continues in step S56, the control unit 205 receives the electric power for predetermined X seconds (step S58), and determines whether or not the electric power reception efficiency of the currently fed electric power is larger than or equal to predetermined β% (step S59).

Here, if the control unit 205 determines that the electric power reception efficiency is larger than or equal to β%, the control unit 205 returns to the process of step S58. Also, if the control unit 205 determines that the electric power reception efficiency is not larger than or equal to β% in step S59, the control unit 205 determines that electricity is not received in a proper state in both settings of the regulator 210, and executes the process to end the power feeding (step S60).

As illustrated in the flowchart of FIG. 10, the control unit 205 switches the conversion method in the regulator 210 on the basis of actual electric power reception efficiency, in order to set appropriate the conversion method and input electric power.

Note that the process illustrated in the flowchart of FIG. 10 may be executed singly. Alternatively, the control unit 205 may execute the process illustrated in the flowchart of FIG. 10, after executing the process to start the power feeding at the start of the power feeding illustrated in the flowchart of FIG. 7 or FIG. 8, for example. Alternatively, the control unit 205 may use both of the selection process based on temperature illustrated in the flowchart of FIG. 9 and the selection process based on efficiency illustrated in the flowchart of FIG. 10.

9. Other Variant Examples

In the examples of embodiments described above, the DC-DC converter 211 and the LDO 212 are provided as the regulator 210. As opposed to this, other two types of regulators that employ different conversion methods may be provided to switch the two types of regulators on the basis of transmission electric power and load electric power. Also, in the embodiment described above, the feed electric power is changed to three steps as illustrated in FIG. 2, for example. As opposed to this, the feed electric power may be changed to two steps or four steps or more. Also, the relationship between feed electric power and voltage and current illustrated in FIG. 2 is just an example, and thus other feed electric power, voltage, and current may be set.

Also, in the examples of embodiments described above, the information of the transmission electric power is transmitted from the electric power feeding device 100 to the terminal device 200. As opposed to this, instead of the transmission electric power, the information for instructing a conversion method and an input voltage of the regulator may be transmitted. Also, in an example of the embodiment described above, the communication unit 107 of the electric power feeding device 100, and the communication unit 206 of the terminal device 200 superimpose a transmission signal on feed electric power, for the purpose of communication. As opposed to this, another wireless or wired transmission channel, which is not in the system for feeding electric power, may be used for communication.

Additionally, the present technology may also be configured as below.

(1)

A non-contact electric power feeding system including:
an electric power feeding device; and
an electric power receiving device configured to receive electric power fed from the electric power feeding device,
wherein the electric power feeding device includes
a primary-side coil,
a driver configured to supply transmission electric power to the primary-side coil,
a primary-side control unit configured to control the transmission electric power supplied by the driver, to a plurality of levels, and
a primary-side communication unit configured to communicate with a side that receives electric power fed from the primary-side coil, and
wherein the electric power receiving device includes
a secondary-side coil configured to receive the electric power transmitted from the primary-side coil,
a rectifier unit configured to rectify reception electric power obtained by the secondary-side coil,
a regulator configured to convert the reception electric power rectified by the rectifier unit to electric power of a predetermined voltage, and to conduct conversion by a plurality of methods,
a secondary-side communication unit configured to communicate with the primary-side communication unit, and
a secondary-side control unit configured to control a method of voltage transformation conducted by the regulator, on the basis of information that the secondary-side communication unit receives from the primary-side communication unit.

(2)

The non-contact electric power feeding system according to (1), wherein when information of transmission electric power decided by the primary-side control unit is transmitted from the primary-side communication unit to the secondary-side communication unit, the secondary-side control unit decides a method suitable for the transmitted transmission electric power, as the method of the conversion conducted by the regulator.

(3)

The non-contact electric power feeding system according to (1) or (2), wherein communication between the primary-side communication unit and the secondary-side communication unit is communication that superimposes a transmission signal on the electric power transmitted from the primary-side coil to the secondary-side coil, and the information of the transmission electric power is transmitted from the primary-side communication unit to the secondary-side communication unit, while small electric power for startup is transmitted from the primary-side coil to the secondary-side coil, and thereafter the primary-side control unit sets transmission electric power indicated by the information of the transmission electric power.

(4)

The non-contact electric power feeding system according to any one of (1) to (3), wherein the primary-side control unit decides the transmission electric power on the basis of information transmitted from the secondary-side communication unit to the primary-side communication unit.

(5)

The non-contact electric power feeding system according to (1) or (2), wherein communication between the primary-side communication unit and the secondary-side communication unit is communication that superimposes a transmission signal on the electric power transmitted from the primary-side coil to the secondary-side coil, and information of load electric power is transmitted from the secondary-side communication unit to the primary-side communication unit while small electric power for startup is transmitted from the primary-side coil to the secondary-side coil, and thereafter the secondary-side control unit sets the transmission electric power indicated by the information of load electric power.

(6)

The non-contact electric power feeding system according to any one of (1), (2), and (5), wherein the secondary-side control unit decides the load electric power on the basis of information transmitted from the secondary-side communication unit to the primary-side communication unit.

(7)

The non-contact electric power feeding system according to any one of (1) to (6), wherein the electric power receiving device includes a temperature sensor that detects a temperature at a vicinity of the secondary-side coil, and the secondary-side control unit controls the method of the voltage transformation conducted by the regulator, on the basis of the temperature detected by the temperature sensor.

(8)

The non-contact electric power feeding system according to any one of (1) to (7), wherein the secondary-side control unit controls the method of the voltage transformation conducted by the regulator, on the basis of efficiency in receiving the transmission electric power.

(9)

The non-contact electric power feeding system according to any one of (1) to (8), wherein the regulator includes two regulators, which are a series regulator and a switching regulator.

(10)

A terminal device including:

a secondary-side coil configured to receive electric power transmitted from a primary-side coil of an electric power feeding device;

a rectifier unit configured to rectify reception electric power obtained by the secondary-side coil;

a regulator configured to convert the reception electric power rectified by the rectifier unit to electric power of a predetermined voltage, and to conduct conversion by a plurality of methods;

a communication unit configured to communicate with the electric power feeding device; and a control unit configured to control a method of voltage transformation conducted by the regulator, on the basis of information received by the communication unit.

(11)

The terminal device according to (10), wherein when information of transmission electric power decided by the electric power feeding device is transmitted to the communication unit, the control unit decides a method suitable for transmitted transmission electric power, as the method of conversion conducted by the regulator.

(12)

The terminal device according to (10) or (11), wherein communication in the communication unit is communication that superimposes a transmission signal on the electric power transmitted from the primary-side coil to the secondary-side coil, and the electric power feeding device is notified of load electric power in the communication performed by the communication unit.

(13)

The terminal device according to any one of (10) to (12), wherein the terminal device includes a temperature sensor that detects a temperature at a vicinity of the secondary-side coil, and the control unit controls the method of the voltage transformation conducted by the regulator, on the basis of the temperature detected by the temperature sensor.

(14)

The terminal device according to any one of (10) to (13), wherein the control unit controls the method of the voltage transformation conducted by the regulator, on the basis of efficiency in receiving transmission electric power.

(15)

The terminal device according to any one of (10) to (14), wherein the regulator includes two regulators, which are a series regulator and a switching regulator.

(16)

A non-contact electric power feeding device including:

a primary-side coil;

a driver configured to supply transmission electric power to the primary-side coil;

a communication unit configured to communicate with a device on a side that receives electric power fed from the primary-side coil; and a control unit configured to control the transmission electric power that the driver supplies to the primary-side coil to a plurality of levels, and to decide the transmission electric power on the basis of information received by the communication unit.

(17)

The non-contact electric power feeding device according to (16), wherein communication performed by the communication unit is communication that superimposes a transmission signal on the electric power transmitted from the primary-side coil, and information of the transmission electric power is transmitted from the communication unit while small electric power for startup is transmitted from the primary-side coil, and thereafter the control unit sets the transmission electric power indicated by the information of the transmission electric power.

(18)

A non-contact electric power feeding method, when non-contact power feeding is conducted from an electric power feeding device including a primary-side coil to an electric power receiving device including a secondary-side coil, the method including:

converting, by a regulator, electric power received by the secondary-side coil to electric power of a predetermined voltage, by a plurality of methods of conversion; and setting a method of voltage transformation conducted by the regulator, on the basis of information obtained in communication between the electric power feeding device and the electric power receiving device.

Further, configurations and processes described in the appended claims are not limited to the exemplary embodiments described above. It should be understood that a person skilled in the art may naturally find various alterations, combinations, and other exemplary embodiments within the scope of the appended claims.

REFERENCE SIGNS LIST 10 electric power feeding device
11 alternating current power supply
12 AC/DC converter
13 electric power transmission driver
14 capacitor
15 primary-side coil
20 terminal device
21 secondary-side coil
22 capacitor
23 rectifier unit
24 regulator
25 charge control unit
26 secondary battery
100 electric power feeding device
101 alternating current power supply
102 AC/DC converter
103 electric power transmission driver
104 primary-side control unit
105 capacitor
106 primary-side coil
107 primary-side communication unit
200 terminal device
201 secondary-side coil
202 capacitor
203 rectifier unit
204 load circuit
205 secondary-side control unit
206 secondary-side communication unit
207 temperature sensor
210 regulator
211 DC-DC converter
212 LDO

The invention claimed is:

1. A non-contact electric power feeding system, comprising:

an electric power feeding device; and
an electric power receiving device configured to receive electric power fed from the electric power feeding device, wherein the electric power feeding device includes:
a primary-side coil,
a driver configured to supply transmission electric power to the primary-side coil,
a primary-side control unit configured to control the transmission electric power to a plurality of levels, and
a primary-side communication unit configured to communicate with a side that receives the electric power fed from the primary-side coil, wherein the electric power receiving device includes:
a secondary-side coil configured to receive the electric power transmitted from the primary-side coil,
a rectifier unit configured to rectify reception electric power obtained by the secondary-side coil,
a regulator configured to convert the reception electric power to electric power of a voltage,
a secondary-side communication unit configured to communicate with the primary-side communication unit, and
a secondary-side control unit configured to control voltage conversion conducted by the regulator, based on first information of transmission electric power communicated between the secondary-side communication unit and the primary-side communication unit.

2. The non-contact electric power feeding system according to claim 1, wherein the primary-side control unit is further configured to determine the first information of transmission electric power, wherein the first information of transmission electric power is transmitted from the primary-side communication unit to the secondary-side communication unit, and wherein the secondary-side control unit is further configured to determine, based on the transmitted first information of transmission electric power, a method of the conversion conducted by the regulator.

3. The non-contact electric power feeding system according to claim 2, wherein communication between the primary-side communication unit and the secondary-side communication unit superimposes a transmission signal on the electric power transmitted from the primary-side coil to the secondary-side coil, and the first information of transmission electric power is transmitted from the primary-side communication unit to the secondary-side communication unit, while small electric power for startup is transmitted from the primary-side coil to the secondary-side coil, and thereafter the primary-side control unit is further configured to set the transmission electric power indicated by the first information of transmission electric power.

4. The non-contact electric power feeding system according to claim 3, wherein the primary-side control unit is further configured to determine the transmission electric power based on second information transmitted from the secondary-side communication unit to the primary-side communication unit.

5. The non-contact electric power feeding system according to claim 2, wherein communication between the primary-side communication unit and the secondary-side communication unit superimposes a transmission signal on the electric power transmitted from the primary-side coil to the secondary-side coil, and wherein second information transmitted from the secondary-side communication unit to the primary-side communication unit corresponds to information of load electric power, while small electric power for startup is transmitted from the primary-side coil to the secondary-side coil, and thereafter the secondary-side control unit is further configured to set the transmission electric power indicated by the information of the load electric power.

6. The non-contact electric power feeding system according to claim 5, wherein the secondary-side control unit is further configured to determine the load electric power based on the first information transmitted from the primary-side communication unit to the secondary-side communication unit.

7. The non-contact electric power feeding system according to claim 1, wherein the electric power receiving device includes a temperature sensor configured to detect a temperature at a vicinity of the secondary-side coil, and the secondary-side control unit is further configured to control the voltage conversion by the regulator, based on the detected temperature.

8. The non-contact electric power feeding system according to claim 1, wherein the secondary-side control unit is further configured to control the voltage conversion by the regulator, based on efficiency in reception of the transmission electric power.

9. The non-contact electric power feeding system according to claim 1, wherein the regulator includes at least a series regulator and a switching regulator.

10. A terminal device, comprising:
a secondary-side coil configured to receive electric power transmitted from a primary-side coil of an electric power feeding device;
a rectifier unit configured to rectify reception electric power obtained by the secondary-side coil;
a regulator configured to convert the reception electric power to electric power of a voltage;
a communication unit configured to communicate with the electric power feeding device; and
a control unit configured to control voltage conversion conducted by the regulator based on information of transmission electric power communicated between the communication unit and the electric power feeding device.

11. The terminal device according to claim 10, wherein the electric power feeding device determines the information of transmission electric power, wherein the information of transmission electric power is transmitted to the communication unit, and wherein the control unit is further configured to determine, based on the transmitted transmission electric power, a method of the conversion conducted by the regulator.

12. The terminal device according to claim 11, wherein communication in the communication unit superimposes a transmission signal on the electric power transmitted from the primary-side coil to the secondary-side coil, and
the electric power feeding device is notified of load electric power based on the communication.

13. The terminal device according to claim 10, wherein the terminal device includes a temperature sensor configured to detect a temperature at a vicinity of the secondary-side coil, and the control unit is further configured to control the voltage conversion conducted by the regulator, based on the detected temperature.

14. The terminal device according to claim 10, wherein the control unit is further configured to control the voltage conversion conducted by the regulator, based on efficiency in reception of transmission electric power from the electric power feeding device.

15. The terminal device according to claim 10, wherein the regulator includes at least a series regulator and a switching regulator.

16. A non-contact electric power feeding method, comprising:
converting, by a regulator, electric power received by a secondary-side coil to electric power of a voltage, wherein non-contact electric power feeding is conducted from an electric power feeding device including a primary-side coil to an electric power receiving device including the secondary-side coil; and
controlling voltage conversion conducted by the regulator, based on information obtained in communication between the electric power feeding device and the electric power receiving device.

* * * * *